March 23, 1926.
C. E. FLORKEY
TOY POWER DRIVE
Filed Jan. 26, 1923
1,577,798
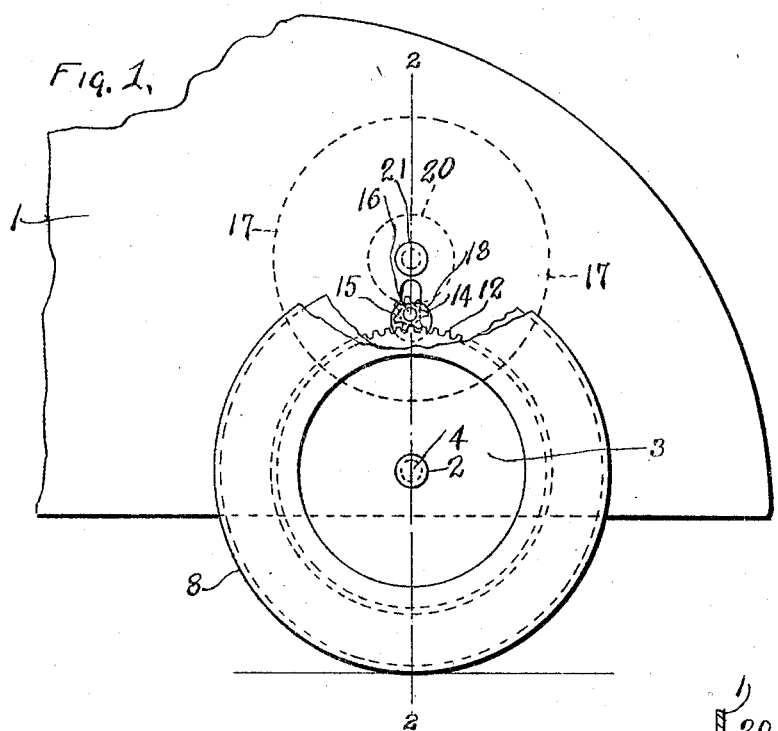
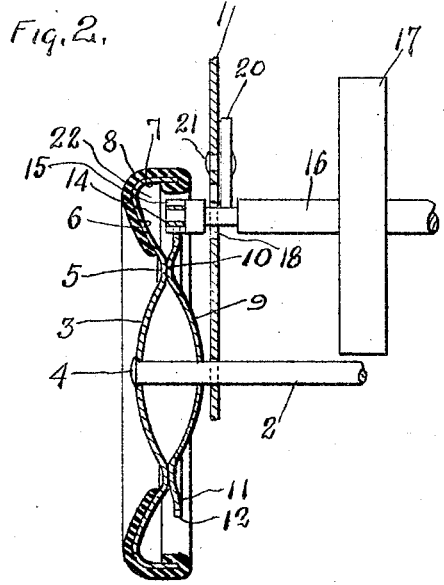
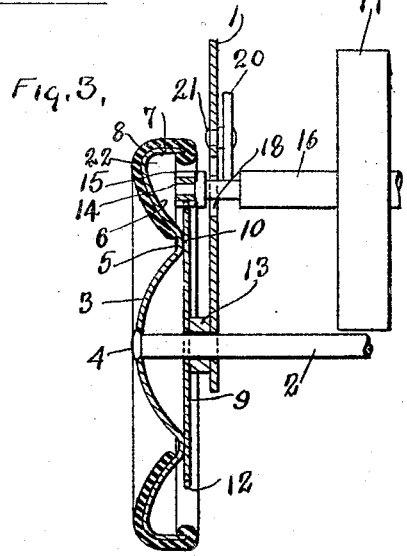
Inventor
Clarence E. Florkey,
By Toulmin & Toulmin,
Attorneys Patented Mar. 23, 1926.

1,577,798

UNITED STATES PATENT OFFICE.

CLARENCE E. FLORKEY, OF DAYTON, OHIO, ASSIGNOR TO THE SCHIEBLE TOY AND NOVELTY CO., OF DAYTON, OHIO, A CORPORATION OF OHIO.

TOY POWER DRIVE.

Application filed January 26, 1923. Serial No. 614,950.

*To all whom it may concern:*

Be it known that I, CLARENCE E. FLORKEY, a citizen of the United States, residing at Dayton, in the county of Montgomery and State of Ohio, have invented certain new and useful Improvements in Toy Power Drives, of which the following is a specification, reference being had therein to the accompanying drawing.

My invention relates to driving mechanism and in particular to driving mechanism for toys and the like.

It is the object of my invention to provide a power mechanism for driving vehicles.

It is my object to provide a gear drive and also means of driving the vehicle by direct application of the gearing to the wheels of the vehicle so that the gearing will be concealed and so that rubber tires may be used on the vehicle.

It is my primary object to apply such a power drive to toys.

It is essential in toys to have a very sturdy and strong type of drive with the gears concealed so that the fingers and clothing of the children using the toys will not become involved in the gears.

It is also the object of my invention to provide rubber tires on such toys to prevent damage to floors and to furniture, which rubber tires may be cheaply and easily applied and at the same time secure the gear drive directly from the source of power to the wheels.

It is an additional object of my invention to provide certain anti-friction devices and means for tightly engaging the several parts with one another with the least amount of lost motion during the generation of power and with the least friction of such parts during the expenditure of the power.

It is a further object of my invention to provide a mechanism having such features of advantage in combination with an inertia wheel.

It is my object to provide a toy which may be used both with and without rubber tires.

Referring to the drawings:

Figure 1 is a side elevation of a toy with the tire and wheel partially broken away to reveal the driving pinion and wheel gear;

Fig. 2 is a section on the line 2—2 of Fig. 1;

Fig. 3 is a section on the line 2—2 of Fig. 1 showing a modified form of wheel gear and axle bearing.

Referring to the drawings in detail:

1 is a frame or body of a vehicle in which there is mounted the main axle 2. This axle is loosely mounted in the frame, there being in the preferred form of my toy a clearance of about $\frac{1}{16}''$ between the axle and the frame. This axle has on the outside of the frame adjacent its outer end a wheel which may be either a disc or spoked wheel. This wheel may be mounted on the axle in any suitable fashion. I prefer to form a cup shaped portion 3 in this wheel with the end of the axle 4 fitting in the base of the cup. The wheel is provided at the rim of the cup with a relatively flat portion 5 which flares outwardly as at 6 to form the side wall of the rim which is turned over as at 7 into a plane substantially at right angles to the vertical axis of the wheel forming a riding surface for the wheel and providing contact with the ground. This rim composed of the parts 6 and 7 is embraced by an overlapping resilient covering 8 forming a tire.

A cup-shaped disc 9 is fastened as at 10 to the portion 5 of the wheel. The cup is oppositely disposed to the cup-shaped portion 3 of the wheel so that a broad bearing is formed between the respective points of contact of the two portions composing the wheel mounted on the axle, that is, portions 9 and 3. This lends considerable strength to the wheel and stability to the structure.

The rim of this cup-shaped member 9 is bent inwardly as at 11 and has its outer edge formed into a series of teeth 12. This complete structure, composed of the parts 9, 10, 11, and 12, constitutes what is known as the wheel gear.

In Fig. 3 a flat plate is used with a bearing member 13. In some forms of construction where a narrower form of toy is desired or a stronger bearing is required due to heavier weights such a bearing is used.

Meshing with this wheel-gear is a driving pinion 14 having teeth 15 meshing with the teeth 12 of the wheel-gear. The driving pinion is fixed to the outer end of the inertia wheel shaft 16 upon which is mounted the inertia wheel 17. This inertia wheel shaft fits in a clearance or cut-away portion 18 in the frame 1. It is supported by the gear or gears 14 and is maintained in engagement therewith by an anti-friction roller 20 which is mounted on the stub shaft 21 carried on the inside wall of the frame 1.

It will be understood that this entire combination of parts may be employed on one or both sides of the toy.

It will be observed that the pinion is located within a pocket 22, formed by the portions 6 and 7 of the wheel rim, thus concealing the teeth of the wheel gear and pinion and preventing a child's hands or clothing from becoming involved in the gearing. It also protects the gearing from accumulation of dirt or other foreign material which might interfere with the operation of the toy.

The arrangement of a loose fitting axle and loose fitting inertia shaft in the frame facilitates the close engagement of the parts without lost motion so that a pressure downwardly on the toy during the period of propulsion by the hand before released, which is known as a period for storing up power, secures this result, and when the pressure is removed provides means for releasing the frictional engagement, allowing the power stored up in the inertia wheel to be freely expended with the least friction. The anti-friction rollers also play their parts of reducing the friction in the storing and expenditure of power.

It is to be understood that I comprehend within my invention suitable modifications and desire to reserve to myself modifications to which I may be entitled in the adaption of my invention to varying conditions.

Having thus fully described by invention, what I claim as new and desire to secure by Letters Patent, is:—

1. The combination with a wheeled toy frame and a floating axle associated therewith, a wheel carried by the axle, a transversely curved housing forming a structural integral part of the wheel and constituting a rim, a plate gear carried by the inner face of the wheel and spaced from the housing and being of less diameter than the diameter of the wheel and housing combined, a power shaft supported in the frame, a gear carried by the shaft and engaging the plate gear and disposed in the housing, the latter serving to protect the operator's fingers from being injured by the gears.

2. In combination, a frame, an axle carried thereby, outwardly dished wheels mounted thereon, a plate gear joined to a portion of said wheel, said plate being flat, a broad bearing carried by said plate engaging with said axle, a downwardly extending and inwardly directed portion of said wheel spaced from but overlapping said teeth to form a rim within which said teeth and driving pinion are located, a driving pinion and driving axle connected thereto, and an inertia wheel mounted thereon.

3. In combination, a frame, an axle carried thereby, outwardly dished wheels mounted thereon, a plate gear joined to a portion of said wheel, said plate being flat, a broad bearing carried by said plate engaging with said axle, a downwardly extending and inwardly directed portion of said wheel spaced from but overlapping said teeth to form a rim within which said teeth and driving pinion are located, a driving pinion and driving axle connected thereto, and an inertia wheel mounted thereon, and anti-friction devices carried by said frame in engagement with the inertia wheel axle.

4. In combination, a frame, an axle carried thereby, outwardly dished wheels mounted thereon, a plate gear joined to a portion of said wheel, said plate being flat, a broad bearing carried by said plate engaging with said axle, a downwardly extending and inwardly directed portion of said wheel spaced from but overlapping said teeth to form a rim within which said teeth and driving pinion are located, a driving pinion and driving axle connected thereto, and an inertia wheel mounted thereon, anti-friction devices carried by said frame in engagement with the inertia wheel axle, and resilient tires mounted on the rim of said wheel.

In testimony whereof, I affix my signature.

CLARENCE E. FLORKEY.